Patented Sept. 9, 1952

2,610,160

UNITED STATES PATENT OFFICE 2,610,160

WALLBOARD CONTAINING A PHENOL FORMALDEHYDE RESIN AND CATTAIL FIBERS

Estelle M. S. Nuncio, New Orleans, La.

No Drawing. Application February 14, 1951,
Serial No. 210,993

4 Claims. (Cl. 260—17.2)

This invention relates to a composition wallboard and efficient process of producing the same.

The primary object of this invention is to produce a wallboard which is light in weight, waterproof, has an attractive marble-like appearance, and possesses excellent heat and sound insulating properties.

A further important object of this invention is to provide a process of preparing the wallboard composition as described hereinabove, which process is efficient, easy to carry out, and economical in that it does not require special apparatus and special conditions of temperature and pressure to produce the finished molded product.

The present composition comprises fibers dispersed and embedded in a phenolic casting resin which is capable of setting rigidly in a relatively short time at temperatures approximating customary room temperature. While different kinds of fibers may be incorporated in the phenolic resins, such as ramie, sugar cane waste, wild oat fibers, ground nut shells, and the like, it has been found that the incorporation of cattail fibers produces a wallboard composition having special properties. Cattail is a tall marsh plant of the genus Typha, otherwise known as reed mace, the most common species of which is *Typha latifolia*. This plant includes fibers and associated seeds loosely supported upon stems, the fibers having the following ingredients in percentage by weight: 3.85% ether extract (fat and cutin), 0.46% ash, 19.16% lignin, and 76.53% cellulose and hemi-cellulose by difference. These fibers are silky, water resistant, very light, have been found to have excellent insulating properties both with regard to heat and sound, require no preliminary grinding or cutting, and when incorporated with the quick, low temperature setting phenolic resins, mold to a very attractive marble-like appearance.

A number of different kinds of quick-setting phenolic resins may be employed as the matrix for dispersing and holding cattail fibers which will be described hereinafter. Plyophen Casting Resin 5023, produced by the Reichhold Chemicals, Inc. is the preferred plastic. This is a phenol-formaldehyde type resin which is compounded with an alkaline catalyst, the resin being a viscous liquid at room temperatures. When an acidic catalyst, such as 5023-A in which the active ingredient is a mineral acid produced by Reichhold Chemicals, Inc., is added to the resin, an acid-alkaline reaction will occur which is exothermic raising the temperature of the resin and allowing the same to set rapidly in an air current at room temperatures of 75° F. or above without the necessity of employing superatmospheric pressures for the molding. Various proportions of the acidic catalyst can be added to the resin depending upon the thickness of the casting desired and after the acidic catalyst has been added to the resin, the mixture should be transferred within a relatively short time to a proper mold to avoid excessive hardening before transfer. This Plyophen Resin 5023 is compatible with various dyes to produce different colors and is also compatible with the cattail fibers.

Another phenolic resin which can be used as a matrix for the cattail fibers is P-398, produced by the Reichhold Chemicals, Inc. This is known as a water-soluble resin glue consisting of phenol-formaldehyde resin and an alkaline catalyst which is liquid at room temperatures. It contains 40–42% by weight of non-volatiles, contains water as the only volatile ingredient, has a viscosity of 225–500 centipoises, and a specific gravity of 1.171–1.191. While it is compatible with cattail fibers and does not require superatmospheric pressure for the setting and the molding of the same, it has the disadvantage over the Plyophen Resin 5023 in that it sets rapidly at temperatures higher than the setting temperatures of the Plyophen Resin 5023. P-398 sets and hardens in 14 minutes at a platen temperature of 220° F.

Yet another phenolic resin which may be used as a matrix for incorporating the cattail fibers is Plyophen 6000, a resorcinol-formaldehyde resin made with an alkaline catalyst produced by the Reichhold Chemicals, Inc. This is a phenolic adhesive which contains 58–62% by weight of volatiles, contains water-ethanol as the volatile ingredients, has a viscosity of 150–400 centipoises, and a specific gravity of 1.125–1.135. In order to render this phenolic resin quick setting at relatively low temperatures, a catalyst must be added to the resin prior to use and the resin must be maintained at a temperature of approximately 75° F. and mixed with a catalyst for approximately 10 minutes. The catalyst is a mixture of formaldehyde and inert organic fillers known in the trade as 6002 and produced by Reichhold Chemicals, Inc. The resin and catalyst cure and set at platen temperatures of 75–180° F. in from 360–1.5 minutes.

The wallboard composition of the present invention having the optimum properties of water resistance, structural rigidity, and heat and sound insulation comprises 100–175 lbs. of the phenolic resin and 200–300 of the cattail fibers. In general, the process of producing the present wallboard composition is carried by pouring the resin into a tank equipped with a suitable agitator. The catalyst to render the resin quick setting at relatively low temperatures is then added slowly to the resin and agitated therewith to obtain proper intermixture and reaction between the resin and the catalyst and also to dissipate the heat produced in the reaction. The cattail fibers are then blown into the mixture slowly and with agitation and the mixture and agitation is continued until proper dispersal of the fibers and the resin matrix is obtained, but the agitation and mixing is limited in time to prevent substantial setting and hardening of the composition in the tank. Thereafter, the mixture is transferred to suitable molds kept in a room where there is slow air circulation maintained at a temperature of 75–80° F.

The following is an example illustrating the manner in which the process is carried out:

Example

100–175 lbs. of Plyophen Casting Resin 5023 is poured into a tank at a temperature of approximately 75° F., the tank being equipped with a suitable agitator. Acidic catalystic 5023-A in an amount of 7–18 lbs. is added to the tank while the agitator is running at relatively slow speeds and is mixed with the resin for a period of 20–30 minutes. Inasmuch as a reaction occurs which gives off heat and raises the temperature of the mixture, the agitation and mixing is maintained for this length of time to obtain thorough interaction between the catalyst and the resin and also to dissipate the heat of reaction and reduce the temperature to prevent any possible injury to the fibers which are added subsequently. 200–300 lbs. cattail fibers are then blown slowly into the mixture and slow agitation is continued for approximately 10 minutes or that length of time necessary to get proper dispersal of the fibers in the resin matrix. The time of mixing the fibers with the resin matrix cannot be excessive since substantial hardening may set in while the composition is still in the mixing tank. The viscous mixture is then transferred or poured into suitable molds which are kept in a room having a slow air circulation maintained at a temperature of approximately 75–80° F. The composition sets and hardens in the molds within a relatively short time and requires no superatmospheric pressures to obtain the proper rigid structure.

While a preferred embodiment of the composition and process has been described hereinabove, it will be obvious to those skilled in the art that minor variations may be made both in the composition and the process without departing from the spirit of the invention and the scope of the appended claims.

Having described the invention, what is claimed as new is:

1. A wallboard composition comprising cattail fibers embedded in a fast setting phenol-formaldehyde resin.

2. The combination of claim 1, wherein 200–300 lbs. fibers are embedded in 100–175 lbs. resin.

3. A wallboard composition comprising cattail fibers embedded in a phenol-formaldehyde resin containing a catalyst rendering the resin fast setting at room temperature.

4. A wall board composition comprising cattail fibers embedded in a fast setting resin from the group consisting of phenol-formaldehyde and resorcinol-formaldehyde.

ESTELLE M. S. NUNCIO.

REFERENCES CITED

The following references are of record in the file of this patent:

UNITED STATES PATENTS

| Number | Name | Date |
|---|---|---|
| 1,718,011 | Vogt | June 18, 1929 |

FOREIGN PATENTS

| Number | Country | Date |
|---|---|---|
| 561,081 | Great Britain | May 4, 1944 |